United States Patent
Danieau et al.

(10) Patent No.: US 9,937,421 B2
(45) Date of Patent: Apr. 10, 2018

(54) HAPTIC CHAIR FOR MOTION SIMULATION

(71) Applicant: THOMSON LICENSING, Issy de Moulineaux (FR)

(72) Inventors: Fabien Danieau, Rennes (FR); Julien Fleureau, Rennes (FR); Philippe Guillotel, Vern sur Seiche (FR); Nicolas Mollet, Meillac (FR); Anatole Lecuyer, Rennes (FR); Marc Christie, Servon sur Vilaine (FR)

(73) Assignee: Thomson Licensing (FR)

( * ) Notice: Subject to any disclaimer, the term of this patent is extended or adjusted under 35 U.S.C. 154(b) by 124 days.

(21) Appl. No.: 14/391,290

(22) PCT Filed: Apr. 11, 2013

(86) PCT No.: PCT/EP2013/057528
§ 371 (c)(1),
(2) Date: Oct. 8, 2014

(87) PCT Pub. No.: WO2013/153137
PCT Pub. Date: Oct. 17, 2013

(65) Prior Publication Data
US 2015/0048933 A1    Feb. 19, 2015

(30) Foreign Application Priority Data

Apr. 13, 2012 (EP) .................................. 12305440
Apr. 11, 2013 (WO) ................. PCT/EP2013/057528

(51) Int. Cl.
*H04B 3/36*      (2006.01)
*A63F 13/28*     (2014.01)
(Continued)

(52) U.S. Cl.
CPC ............ *A63F 13/28* (2014.09); *A47C 15/004* (2013.01); *A63G 31/00* (2013.01); *A63G 31/16* (2013.01);
(Continued)

(58) Field of Classification Search
CPC ......... G08B 6/00; A47C 15/004; A63F 13/08; A63F 2300/1043; A63F 2300/1037
(Continued)

(56) References Cited

U.S. PATENT DOCUMENTS 3,983,640 A * 10/1976 Cardullo .................. G09B 9/10
                                                                               297/284.3
4,966,413 A * 10/1990 Palarski ................. A47C 1/022
                                                                               297/284.6
(Continued)

FOREIGN PATENT DOCUMENTS

WO     WO2011032937       3/2011

OTHER PUBLICATIONS

Dasgupta et al., "The Stewart platform manipulator: a review", Mechanism and Machine Theory, vol. 35, Issue 1, Jan. 2000, pp. 15-40.

*Primary Examiner* — Daniel Previl
(74) *Attorney, Agent, or Firm* — Jack Schwartz & Associates, PLLC

(57) ABSTRACT

A device for providing the illusion of motion consists of at least two movable parts for stimulating the vestibular sense and the kinaesthetic sense of a user independently from each other. A moving headrest is provided for stimulating the vestibular sense of a user and a moving armrest is provided for stimulating the kinaesthetic sense of a user.

13 Claims, 5 Drawing Sheets

(51) Int. Cl.
*A47C 15/00* (2006.01)
*A63G 31/16* (2006.01)
*A63G 31/00* (2006.01)
*G08B 6/00* (2006.01)

(52) U.S. Cl.
CPC ........ *G08B 6/00* (2013.01); *A63F 2300/1037* (2013.01); *A63F 2300/1043* (2013.01)

(58) Field of Classification Search
USPC ......... 340/407.1, 507, 515, 517, 693.8, 521, 340/529, 539.12, 539.22, 539.24, 825.23
See application file for complete search history.

(56) References Cited

U.S. PATENT DOCUMENTS

| | | | | |
|---|---|---|---|---|
| 5,669,818 | A | * | 9/1997 | Thorner .................. A63F 13/02 463/30 |
| 5,980,255 | A | | 11/1999 | Mathieu et al. |
| 6,012,926 | A | * | 1/2000 | Hodges ................. A61M 21/00 434/236 |
| 6,056,362 | A | * | 5/2000 | de la Haye ............. A47C 3/02 248/394 |
| 9,147,328 | B2 | * | 9/2015 | Ioffreda .................... H04R 3/00 |
| 2004/0049323 | A1 | | 3/2004 | Tijerina et al. |
| 2007/0035164 | A1 | * | 2/2007 | North ................... A47C 1/0242 297/217.1 |
| 2008/0093502 | A1 | * | 4/2008 | Bettell .................... B64D 11/06 244/118.5 |
| 2008/0132383 | A1 | * | 6/2008 | Einav ...................... A61H 1/02 482/8 |
| 2010/0013614 | A1 | | 1/2010 | Sproelich et al. |
| 2010/0205867 | A1 | | 8/2010 | Park |
| 2012/0259604 | A1 | | 10/2012 | Ouarti et al. |

* cited by examiner

HAPTIC CHAIR FOR MOTION SIMULATION

This application claims the benefit, under 35 U.S.C. § 365 of International Application PCT/EP2013/057528, filed Apr. 11, 2013, which was published in accordance with PCT Article 21 (2) on Oct. 17, 2013 in English and which claims the benefit of European patent application No. 12305440.5 filed Apr. 13, 2012

The present invention relates to a device for providing the illusion of motion and a method for automatically generating data for controlling a haptic device.

New technology developments allow the creation of more and more immersive multimedia systems. 3D images and sound spatialization are now present in the end-user's living space. But these systems are still limited to the stimulation of two senses, sight and hearing.

The human perception of movement is based on information from three perception systems. The visual system provides information of the position of objects in space and thus the position relatively to these objects. The vestibular system organ located in the inner ear is composed of three orthogonally oriented semi-circular canals and two otolith organs. Semi-circular canals allow to detect rotational movements (angular accelerations) while otolith organs sends information to the brain about linear accelerations. The haptic sense composed by the tactile sense and the kinesthesic sense makes one feel the position of our limbs relatively to our body. As soon as a movement changes the relation between the limbs and the trunk, information about the movement is perceived. The tactile sense allows to feel our visceral organs, which work in this case as accelerometers, but also pressure or friction on the skin due to movements.

Motion simulators are well-known devices designed to make an audience member feel motion. They are intensively used as driving or flight simulators for learning purposes. Most of them are based on the Stewart's platform (B. Dasgupta, "The Stewart platform manipulator: a review", Mechanism and Machine Theory, Vol. 35, Issue 1, pp. 15-40, January 2000). A motion simulator is basically a seat attached on this kind of platform that may be especially used to enhance audiovisual experience.

Also comfortable chairs placed on four actuators dedicated to the end-user's living-room are known in the art. These chairs allow three degrees of freedom (pitch, roll and heave) for audiovisual content viewing and consumer applications. The three degrees of freedom are movement along the vertical axis (heave) and rotation around two perpendicular horizontal axes (pitch and roll). But these chairs remain expensive, render only 3-DoF and are still based on a Stewart's platform.

These kind of motion simulators mainly address the vestibular sense of a user. A user is able to sense acceleration and rotation of his body and this way and feels movement.

The sensation of motion may also be induced by a force feedback device, as disclosed in WO2011/032937. By applying a force on the user's hand, the system generates an illusion of motion with force feedback. While the interface is pulling the hand, the user feels moving forward. A force feedback device addresses the kinaesthetic sense of a user.

US2010/0205867 discloses a theatre seat having vibration units in the backrest and in the seat to generate vibrations penetrating the user. This kind of theatre seat addresses the tactile sense of a user.

It is an object of the invention to propose a low cost device to enhance the haptic experience of a user when watching audiovisual content and to provide a more sophisticated audiovisual experience.

According to the invention, a device for providing the illusion of motion is proposed. The device consists of at least two movable parts for stimulating the vestibular sense and the kinaesthetic sense of a user independently from each other. The device contains a moving headrest for stimulating the vestibular sense of a user. Further, the device contains a moving armrest for stimulating the kinaesthetic sense of a user. This has the advantage that two essential senses of the human being, vestibular sense and kinaesthetic sense are penetrated by the device at the same time but independently from each other to enhance the user's haptic experience. When using such a system the user watches audiovisual content, e.g. a movie or plays a computer game. Thus, also the input of the user's visual sense providing information about the objects he sees and his position relatively to these objects is available. This enhances a video viewing experience with "realistic" haptic effects of motion in a consumer environment. The device provides the illusion of motion without moving itself.

Advantageously, the device further is provided with a second movable armrest for further stimulating the kinaesthetic sense of a user. Advantageously, the device further has a movable seat for further stimulating the kinaesthetic sense of a user. Further, the device has a movable legrest for further stimulating the kinaesthetic sense of a user. In addition, the device further has a movable backrest for further stimulating the kinaesthetic sense of a user. This has the advantage that, by increasing the number of force feedback devices, the kinaesthetic sensing of the user is penetrated in a more dedicated way. This enhances the overall haptic experience.

Advantageously, each movable part of the device is displaceable in at least one degree of freedom. Displacement in up to three degrees of freedom is preferable. In a further improvement, each movable part of the device is rotatable in at least one degree of freedom. Advantageously, each moveable part of the device is rotatable in up to three degrees of freedom. In other words, each moveable part of the device has from one degree of freedom up to six degrees of freedom to enhance the overall haptic experience of the user.

Advantageously, the device further consists of an array of stamps being integrated in at least one element of the device. These elements are for example backrest, seat, armrest, headrest or legrest. The movable stamps are used for stimulating the tactile sense of a user. This has the advantage that the device addresses a further sense of the user, the tactile sense. All senses penetrated by the device are addressed by the device in a coherent way, so that the user gets an even better illusion of being part of the audiovisual content he is experiencing, as several of his senses support the impression he receives via his visual sense and his hearing sense. Advantageously, each stamp of the array of stamps is displaceable by solenoids which are controlled independently.

Advantageously, the device according to the invention is integrated into a chair. Thus, a user can sit in the chair when watching audiovisual content and at the same time experience the haptic stimulation.

According to another aspect of the invention, a method for automatically generating data for controlling a haptic device is proposed. First, data for stimulating the vestibular sense of a user are determined based on audiovisual content. Second, data for stimulating the kinaesthetic sense of a user are determined based on audiovisual content. From these data, control signals for controlling at least one movable headrest for stimulating the vestibular sense of a user and one moveable armrest for stimulating the kinaesthetic sense of a user are determined. This has the advantage that two essential senses of the human being, the vestibular sense and the kinaesthetic sense are penetrated according to the method at the same time but independently from each other to enhance the user's haptic experience.

Advantageously, further control signals are determined for controlling at least one of a second movable armrest for stimulating the kinaesthetic sense of a user, a movable seat for stimulating the kinaesthetic sense of a user, a movable legrest for stimulating the kinaesthetic sense of a user and a movable backrest for stimulating the kinaesthetic sense of a user. This has the advantage that by increasing the number of force feedback devices, the kinaesthetic sensing of the user is penetrated in a more dedicated way. This enhances the overall haptic experience.

Advantageously, control signals for controlling at least one array of movable stamps for stimulating the tactile sense of a user are determined. The arrays of stamps are integrated in at least one element of the haptic device, as for example the backrest, seat and legrest. This has the advantage that the device addresses a further sense of the user, the tactile sense, to enhance the haptic experience.

Advantageously, control signals for controlling at least one of displacement and rotation according to at least one degree of freedom of the moveable parts are determined.

For better understanding the invention shall now be explained in more detail in the following description with reference to the figures. It is understood that the invention is not limited to this exemplary embodiment and that specified features can also expediently be combined and/or modified without departing from the scope of the present invention.

Figure 1:
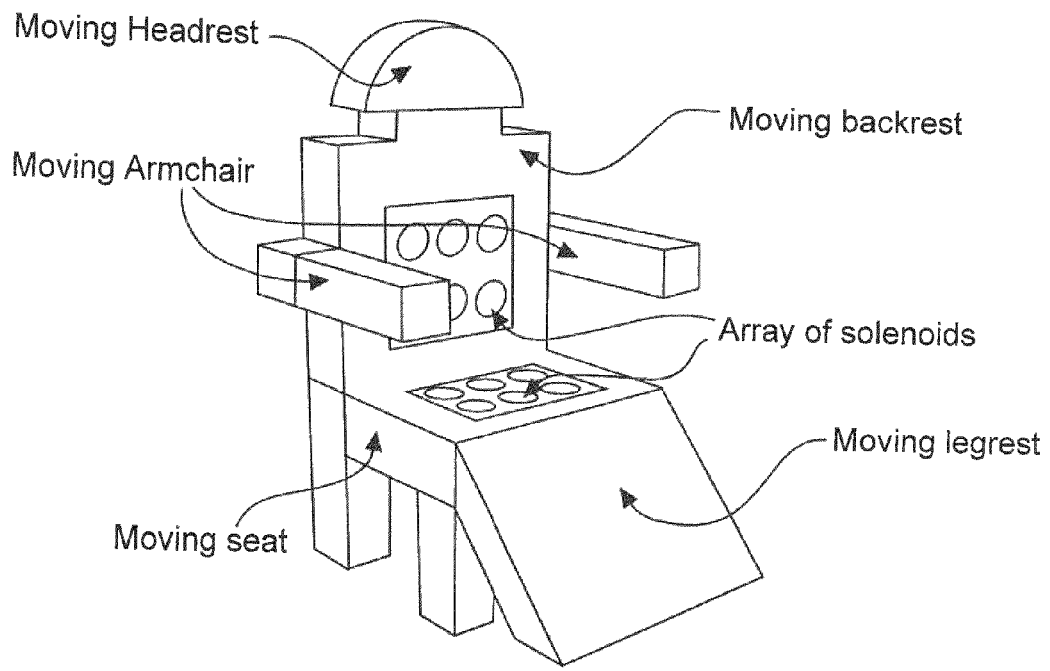
FIG. 1 shows a device according to the invention
Figure 3:
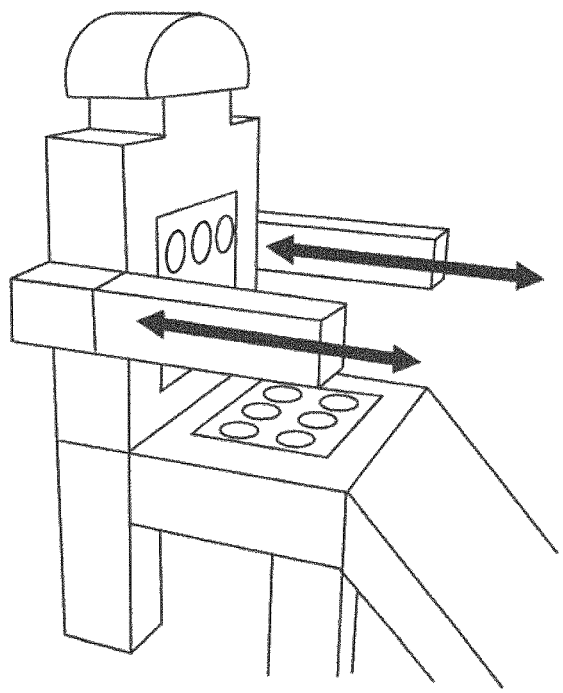
Figure 4:
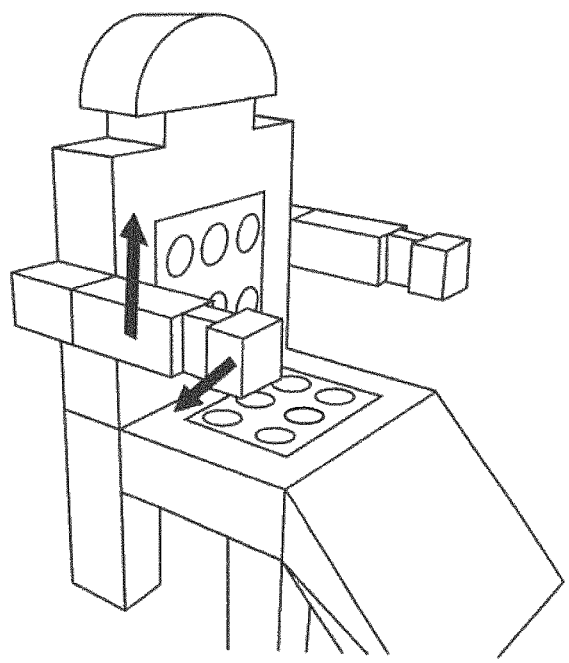
Figure 5:
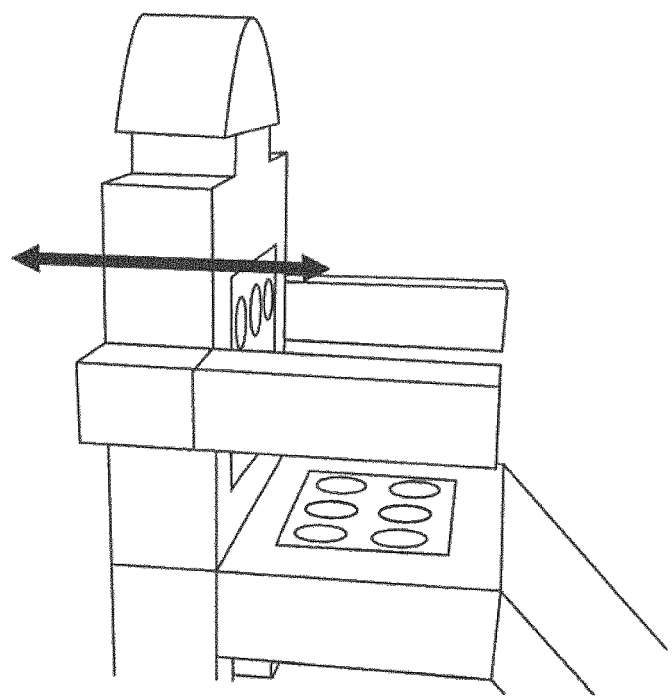
Figure 6:
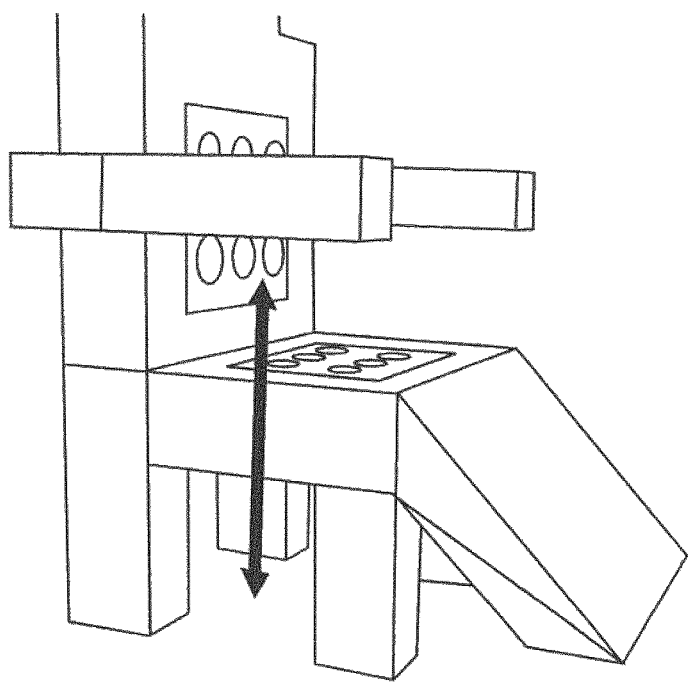
Figure 7:
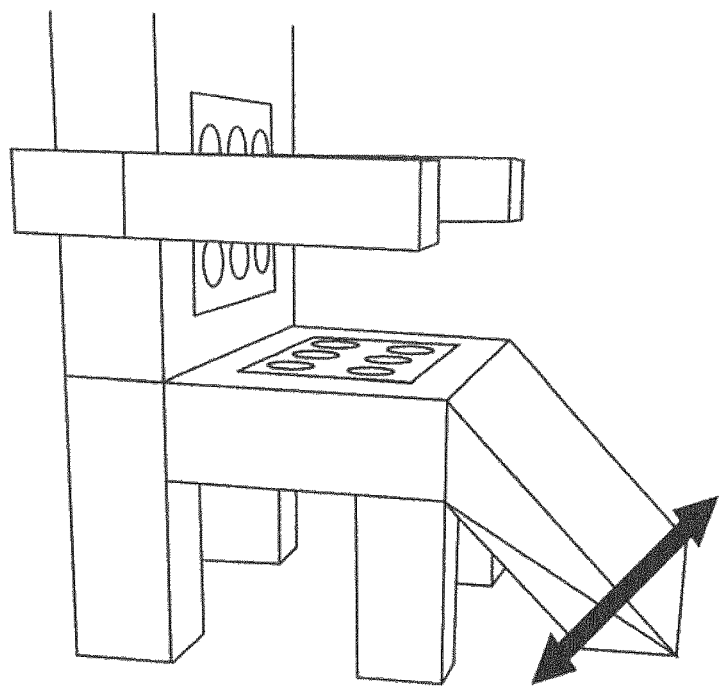
Figure 8:
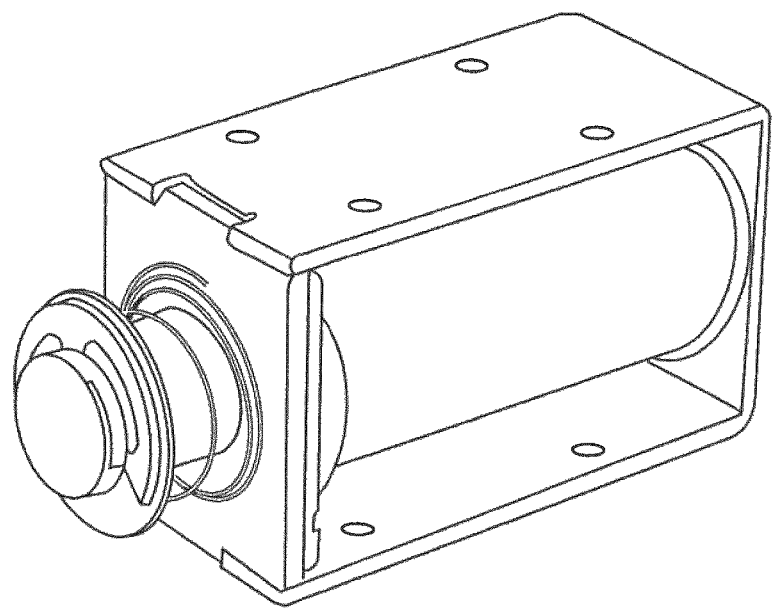
Figure 9:
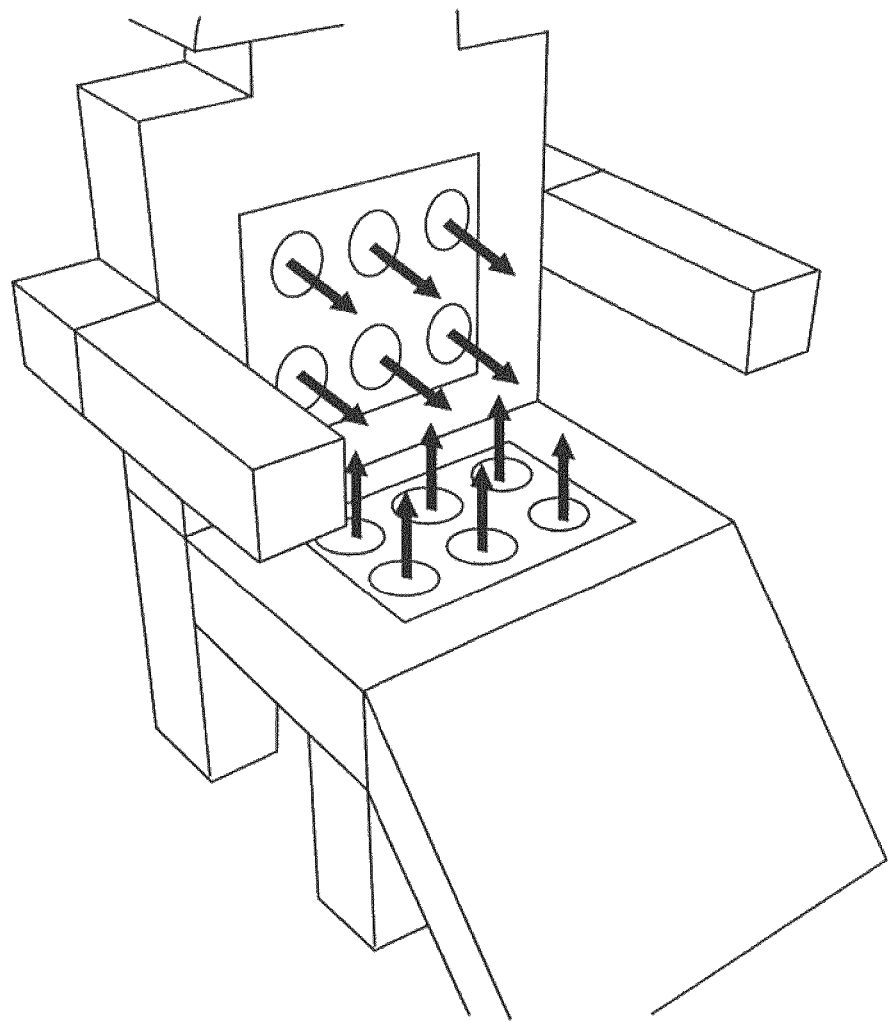

FIG. 3 shows a first embodiment of moveable armrests of the device according to the invention FIG. 4 shows a second embodiment of moveable armrests of the device according to the invention FIG. 5 shows a moveable backrest of the device according to the invention FIG. 6 shows a moveable seat of the device according to the invention FIG. 7 shows a moveable legrest of the device according to the invention FIG. 8 shows a solenoid for moving a stamp FIG. 9 shows an array of movable stamps integrated into the backrest and the seat of the device according to the invention FIG. 1 shows an exemplary embodiment of the invention. The device is integrated into a chair, on which a user sits while watching audiovisual content, e.g. a movie or gaming content. The chair has a moveable headrest, two moveable armrests, a moveable backrest, a moveable seat, a moveable legrest and two arrays of moveable stamps integrated into the seat and the backrest. All these parts will be described in the following.

Figure 2:
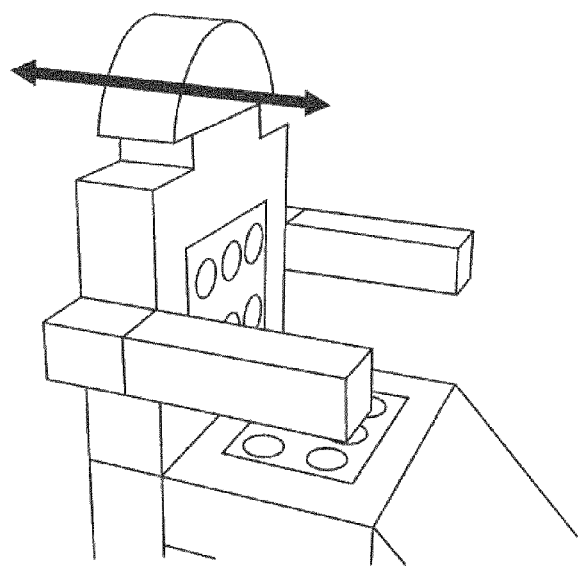
FIG. 2 shows a moveable headrest of the device according to the invention

FIG. 2 shows the moveable headrest of the chair. The sensation of motion is triggered by a motorized headrest controlled by a one degree of freedom motor. The headrest is movable back and forth. If a user sits on the chair, by pushing the user's head forward, the device makes the user feel a sensation of acceleration. A deceleration is provided by pulling the user's head backward. The vestibular sense of the user is stimulated this way. Moving the user's head back and forth also stimulates the kinaesthetic sense of a user. It has to be assured that the user's head stays in contact with the headrest also when the headrest is pulled backwards. Up to a six degrees of freedom movement (displacement and rotation in different directions) of the headrest extends the range of simulated motions.

FIG. 3 shows a first embodiment of moveable armrests of the chair. The sensation of acceleration is generated by a one degree of freedom armrest. The sensation of acceleration is provided by pushing the user's arm forward. The deceleration is provided by a pulling force. Up to a six degrees of freedom movement (displacement and rotation in different directions) of the armrests extends the range of simulated motions.

FIG. 4 shows a second embodiment of moveable armrests of the chair. The armrests are composed of two parts. One part is dedicated to moving the user's arm and the other part is dedicated to moving the user's hand. Up to a six degrees of freedom movement (displacement and rotation in different directions) of each moveable part of the armrests extends the range of simulated motions.

FIG. 5 shows a moveable backrest of the chair. The motorized backrest is controlled by a one degree of freedom motor. By pushing the user's back forward, the device makes the user feel a sensation of acceleration. A deceleration is provided by pulling the user's back backward. Up to a six degrees of freedom movement (displacement and rotation in different directions) of the backrests extends the range of simulated motions.

FIG. 6 shows a moveable seat of the chair. The motorized seat is controlled by a one degree of freedom motor. For instance, by pushing the user upward, the device makes the user feel a sensation of elevation. A free-fall is provided by pulling the user downwards. Up to a six degrees of freedom movement (displacement and rotation in different directions) of the seat extends the range of simulated motions.

FIG. 7 shows a moveable legrest of the chair. The motorized backrest is controlled by a one degree of freedom motor. For instance, by pushing the user's legs forward, the device makes the user feel a sensation of acceleration. A deceleration is provided by pulling the user's legs backward. Up to a six degrees of freedom movement (displacement and rotation in different directions) of the legrest extends the range of simulated motions. Like the moving armrest, also more complex legrests which are split in several parts dedicated to moving each leg and foot independently are applicable.

FIG. 8 shows a solenoid for moving a stamp. Arrays of such stamps are placed on the seat, the backrest and/or the legrest of a chair. This is shown in FIG. 9. The size of the arrays is adapted to the size of the chair. Each solenoid and thus each stamp is controlled independently from the others. These arrays of stamps are used to modify the pressure applied on the user's skin and make him feel a sensation of motion. In this way, the tactile sense of the user is stimulated.

For example, the array of stamps set on the backrest provides a sensation of acceleration by applying a pressure on the user's back. By reducing the pressure, it provides a sensation of deceleration. In a similar way, the array set on the seat provides sensations of elevation and free-fall. By stimulating the tactile sense of a user in addition to the kinaesthetic sense of a user, the haptic effects are increased.

The invention claimed is:

1. A device for providing the illusion of motion, wherein the device comprises at least two movable parts for stimulating vestibular sense and kinaesthetic sense independently, each of the at least two movable parts being displaceable according to at least two degrees of freedom, each of the at least two movable parts being displaceable independently relative to each other, wherein the at least two movable parts include a moving headrest for stimulating the vestibular sense and at least one moving armrest for stimulating the kinaesthetic sense.

2. The device according to claim 1, further comprising a movable seat for stimulating the kinaesthetic sense.

3. The device according to claim 1, further comprising a movable legrest for stimulating the kinaesthetic sense.

4. The device according to claim 1, further comprising a movable backrest for stimulating the kinaesthetic sense.

5. The device according to claim 1, wherein a movable part of the device is further rotatable in at least one degree of freedom.

6. The device according to claim 1, further comprising an array of movable stamps for stimulating tactile sense.

7. The device according to claim 6, wherein the array of movable stamps is integrated in at least one of a backrest, seat, armrest, headrest and legrest.

8. The device according to claim 6, wherein each stamp of the array of movable stamps is displaceable by independently controlled solenoids.

9. The device according to claim 1, wherein the device is a chair.

10. A method for automatically generating data for controlling a haptic device, comprising:

determining data for stimulating vestibular sense from audiovisual content;
determining data stimulating kinaesthetic sense from audiovisual content;
determining control signals for controlling a movable headrest for stimulating the vestibular sense and at least one moveable armrest for stimulating the kinaesthetic sense, the at least a movable headrest being displaceable independently relative to said at least one moveable armrest, each of the at least a movable headrest and said movable armrest being displaceable according to at least two degrees of freedom.

11. The method according to claim 10, further comprises determining control signals for controlling at least one of a movable seat for stimulating the kinaesthetic sense, a movable legrest for stimulating the kinaesthetic sense and a movable backrest for stimulating the kinaesthetic sense.

12. The method according to claim 10, further comprises determining control signals for controlling an array of movable stamps for stimulating the tactile sense, the array of stamps being integrated in at least one of the elements of the haptic device.

13. The method according to claim 10, wherein the determining of the control signals further comprises determining control signals for controlling at least one of displacement and rotation according to at least one degree of freedom of the movable parts.

* * * * *